(12) United States Patent
Beall

(10) Patent No.: US 8,021,999 B2
(45) Date of Patent: Sep. 20, 2011

(54) HIGH STRENGTH MACHINABLE GLASS-CERAMICS

(75) Inventor: George Halsey Beall, Big Flats, NY (US)

(73) Assignee: Corning Incorporated, Corning, NY (US)

(*) Notice: Subject to any disclaimer, the term of this patent is extended or adjusted under 35 U.S.C. 154(b) by 86 days.

(21) Appl. No.: 12/471,523

(22) Filed: May 26, 2009

(65) Prior Publication Data
US 2009/0318277 A1    Dec. 24, 2009

Related U.S. Application Data

(60) Provisional application No. 61/074,815, filed on Jun. 23, 2008.

(51) Int. Cl.
*C03C 10/16* (2006.01)
(52) U.S. Cl. .......................................................... 501/3
(58) Field of Classification Search ..................... 501/3
See application file for complete search history.

(56) References Cited

U.S. PATENT DOCUMENTS

| | | | |
|---|---|---|---|
| 3,689,293 A | 9/1972 | Beall | |
| 3,732,087 A | 5/1973 | Grossman | |
| 3,756,838 A | 9/1973 | Beall | |
| 3,839,055 A | 10/1974 | Grossman | |
| 4,414,281 A | 11/1983 | Hoda | |
| 4,431,420 A | 2/1984 | Adair | |
| 4,536,452 A | 8/1985 | Stempin et al. | |
| 4,652,312 A | 3/1987 | Grossman et al. | |
| 5,246,889 A | 9/1993 | Kasuga et al. | |
| 5,480,844 A * | 1/1996 | Matsui et al. | 501/3 |
| 6,375,729 B1 | 4/2002 | Brodkin et al. | |
| 6,645,285 B2 | 11/2003 | Brodkin et al. | |
| 2009/0274869 A1 * | 11/2009 | Beall et al. | 428/131 |

FOREIGN PATENT DOCUMENTS

| | | | |
|---|---|---|---|
| DE | 3306683 A | | 9/1983 |
| JP | 05009040 | * | 1/1993 |
| JP | 05294669 | * | 11/1993 |
| SU | 1382830 A | | 3/1988 |
| WO | 2004/071979 A2 | | 8/2004 |

OTHER PUBLICATIONS

Vitron Web Page—http://www.vitron.de/english/vitronit.php.
Markettech International Inc Produt Data Sheet; 1 page.
Macor® Presentation; Corning Incorporated; 4 pages.
Bentley et al; "Kinetic Neutron Diffraction and Sans Studies of Phase Formation in Bioactive Machinable Glass Ceramics"; Biomedical Materials 2 (2007) 151-157.
Patent Abstract of Japan 2007-031269; Shogo et al; "Machinable Glass Ceramic and Process for Production Therof"; English Version, Aug. 2007.
Database WPI Week 198841, Thomson Scientific, London, GB: AN 1988-290795, Apr. 1986.

* cited by examiner

*Primary Examiner* — Karl Group
(74) *Attorney, Agent, or Firm* — Walter M. Douglas

(57) ABSTRACT

In one aspect the invention is directed to a machinable glass-ceramic having a high degree of crystallinity (greater than 50 Vol. %), high mechanical strength (MOR>150 MPa) In accordance with the invention, the machinable glass-ceramics described herein consists essentially of, in weight percent, 35-55% $SiO_2$, 6-18% $Al_2O_3$, 12-27% MgO, 3-12% F, 5-25% SrO, 0-20% BaO and 1-7% $K_2O$. The machinable glass-ceramics of the invention have a dielectric constant of <8 (typically being in the range of 6-8) at 25° C. and 1 KHz; a loss tangent of <0.002 at 25° C. and 1 MHz; a CTE in the range of 80-120×$10^{-7}$/° C. in the temperature range of 25-300° C.; a Poisson's ration of approximately 0.25; and a porosity of 0%.

5 Claims, No Drawings

HIGH STRENGTH MACHINABLE GLASS-CERAMICS

PRIORITY

This application claims the priority of U.S. Provisional Application No. 61/074,815 filed Jun. 23, 2008 in the name of George H. Beall.

FIELD

The invention is directed to high strength machinable glass-ceramic materials.

BACKGROUND

Mica is classified as a phyllosilicate; its basic structural feature is a composite sheet in which a layer of octahedrally-coordinated cations is sandwiched between two identical layers of linked $(Si,Al)O_4$ tetrahedra. The general formula of the mica structure can be found in Dana's New Mineralogy, R. V. Gaines et al., eds. (John Wiley & Sons, New York 1997), pages 1444-1446 and the structure can be written as:

$$A_{0.5}R_{2-3}T_4O_{10}X_2,$$

where:

A=a large monovalent or bivalent ion (e.g. $Na^+$, $K^+$, $Rb^+$, $Cs^+$, $Ca^{2+}$, $Sr^{2+}$, $Ba^{2+}$), or a partial vacancy (partial vacancy denoted by subscript "0"), R=an octahedrally-coordinated cation (e.g. $Li^+$, $Mg^{2+}$, $Fe^{2+}$, $Mn^{2+}$, $Zn^{2+}$, $Al^{3+}$, $Fe^{3+}$, $Mn^{3+}$, $V^{3+}$), T=a tetrahedrally-coordinated cation (predominantly $Si^{4+}$, with $Al^{3+}$ and $B^{3+}$), and X=is an anion (predominantly $OH^-$ in minerals, but $F^-$ in glass-ceramics. X may also be partially $O^{2-}$.)

Micas are extremely common in rocks, and numerous classification systems exist for them. In glass-ceramics, micas are typically classified as alkaline (containing alkali ions) and non-alkaline (containing no monovalent ions), and as trisilicic (where $T_4$ in the formula above is $(Si_3Al)$) and tetrasilicic $(Si_4)$. These compositional parameters can be varied to produce desired properties in a glass-ceramic.

Machinable mica glass-ceramics based on mica crystal phases were originally disclosed in the art more than thirty years ago [e.g. U.S. Pat. Nos. 3,689,296, 3,732,087, 3,839,055, and 3,756,838], and Table 1 below shows general formulas for trisilicic, tetrasilicic and non-alkali glass-ceramics having mica structures, the alkali-containing glass-ceramics being included in the trisilicic and tetrasilicic categories. These materials have found numerous uses based on their unusual capability of being machinable to high tolerances using conventional high speed metal-working tools. By suitably tailoring their compositions and nucleation and crystallization temperatures, a wide range of microstructures can be obtained, including the "house-of-cards" microstructure of relatively large mica crystals with high two-dimensional aspect ratios, which most enhances the inherent machinability of the materials (see W. Höland and G. Beall, *Glass Ceramic Technology* (Amer. Ceramic Soc., Westerville, Ohio, 2002), pages 7-9 and 236-241. Additionally, one can refer to U.S. Pat. No. 2,920,971 (Stookey), the basic patent in the field of glass-ceramics, which provides an extensive study of the practical aspects and theoretical considerations that must be understood in the manufacture of such articles as well as a discussion of the crystallization. More recent disclosures of machinable glass-ceramics (largely directed to glass-ceramics for dental applications) include PCT International Publication No. WO 2004/071979 A2 and U.S. Pat. Nos. 6,645,285, 6,375,729, 6,645,285, 4,652,312, 5,246,889 and 4,431,420. The foregoing machinable mica glass-ceramics typically have an inherent white color. For certain applications, however, especially for consumer-oriented products or dental applications (hued to match existing teeth), a colored machinable glass-ceramic is desired.

While existing machinable glass-ceramic have many valuable properties, improvement are still highly desirable, particularly with regard to strength and fracture toughness. The present invention is directed to a machinable glass-ceramming having improved characteristics, including high strength and high fracture toughness.

TABLE 1

General Types of mica structures in glass-ceramics (prior art)

| Wt % | Trisilicic mica GCs | Tetrasilicic GC | Non-alkali mica GC |
|---|---|---|---|
| $SiO_2$ | 25-60 | 45-75 | 30-65 |
| $Al_2O_3$ | 5-25 | 0-5 | 5-26 |
| $B_2O_3$ | 5-15 | 0 | |
| MgO | 5-25 | 8-30 | 10-35 |
| F | 4-20 | 3-15 | 4-12 |
| $K_2O$ | See below | 2-20 | |
| $Li_2O$ | 0-7 | 0-5 | |
| $R_2O$ | 2-20 | See below | |
| $ZrO_2$ | | 0-7 | |
| SrO | | | 5-25 |
| BaO | | | 0-25 |
| Where | The sum of $Al_2O_3 + B_2O_3 = 15$-$35\%$ | $Na_2O = 0$-$5$ | |
| | The sum of $MgO + Li_2O = 6$-$25\%$ | | |
| | $R_2O$ = alkali oxides: | | |
| | $K_2O = 0$-$15\%$ | | |
| | $Na_2O = 0$-$15\%$ | | |
| | $Rb_2O = 0$-$15\%$ | | |
| | $Cs_2O = 0$-$20\%$ | | |

SUMMARY

In one aspect the invention is directed to a high strength machinable glass-ceramic having a high degree of crystallinity (greater than 50 Vol. % in one embodiment; greater than 60 Vol. % in another embodiment; and greater than 80 Vol. % in a further embodiment; the remainder percentage being the glass phase), high mechanical strength (MOR>150 MPa, MOR=Modulus of Rupture), In accordance with the invention, the machinable glass-ceramics described herein consist essentially of, in weight percent on an oxide basis (except fluorine which is simply F and is not an oxide), 35-55% $SiO_2$, 6-18% $Al_2O_3$, 12-27% MgO, 3-12% F, 6-25% SrO, 0-20% BaO and 1-7% $K_2O$. In an additional embodiment the composition of the invention consists essentially of 35-55% $SiO_2$, 6-18% $Al_2O_3$, 12-27% MgO, 3-12% F, 6-25% SrO, 5-20% BaO and 1-5% $K_2O$ (to reduce swelling and lower the dielectric constant K). In another embodiment the composition consists essentially of, in weight percent, 40-50% $SiO_2$, 8-12% $Al_2O_3$, 14-22% MgO, 5-10% F, 8-18%% SrO, 0-20% BaO and 2-5% $K_2O$.

In another embodiment the machinable glass-ceramics of the invention may also be colored to an appropriate colored using colorants known in the art, Examples, without limitation, of such colorants include $Co_3O_4$, CoO (blue-violet); NiO (grey-brown); $Cr_2O_3$ (green-brown); CuO (blue-green); FeO, $Fe_2O_3$ (green-brown); NiS (grey); CdS (yellow). The colorants are added in an amount in the range of >0 wt % to ≦3 wt %, except that when the colorant is iron the iron is present in an amount of >0 wt % to ≦20 wt %. The colorants are added in the form of metal oxides and/or sulfides. Black machinable glass-ceramics can be made by adding FeO+ Fe$_2$O$_3$ in an amount in the range of 2-20 wt %, preferably in the range of 7-20 wt %. Typically when colorants are added, they replace part of the SiO$_2$, Al$_2$O$_3$, MgO and SrO when SrO is greater than 5 wt %.

In a further embodiment the invention is directed to a colored machinable glass ceramics having a color other than black, a preferred composition consisting essentially of 35-55% SiO$_2$, 6-18% Al$_2$O$_3$, 12-27% MgO, 3-12% F, 6-25% SrO, 0-20% BaO and 1-7% K$_2$O and colorant in the range of >0 wt % to ≦3 wt %. In a further embodiment, the invention is directed to a black colored, machinable glass-ceramic consisting essentially of 35-55% SiO$_2$, 6-18% Al$_2$O$_3$, 12-27% MgO, 3-12% F, 6-25% SrO, 0-20% BaO and 1-7% K$_2$O, and 7-20% FeO+Fe$_2$O$_3$.

DETAILED DESCRIPTION

When a composition herein is given a range of 0-X wt %, this range refers to the amount of material added to a batch and excludes contaminant levels of the same material. As those skilled in the art know, metals, for example, sodium and iron, are frequently found at contaminant levels in batched glass and glass-ceramic products. Consequently, it is to be understood that in those cases where a material is not specifically added to a batch, added, any such material that may be present in an analyzed sample of the final glass-ceramic material is contaminant material. Except for iron oxides, where contaminant levels are typically around the 0.03 wt % (300 ppm) level, contaminant levels are less than 0.005 wt % (50 ppm). The term "consistently essentially of" is to be understood as not including contaminant levels of any material.

The invention is directed to machinable glass-ceramics containing the predominant phase fluormica which is believed composed of a solid solution between SrMg$_6$Al$_2$Si$_6$O$_{20}$F$_4$ and KMg$_3$AlSi$_3$O$_{10}$F$_2$, and where Ba may partially replace Sr. These machinable glass-ceramics, show a high crystallinity and high mechanical strength (MOR>150 MPa). For example, slabs of rough dimensions 4"×1"×½" were thrown with force onto the floor without breakage, indicative of high strength and high fracture toughness. In contrast, commercially available glass-ceramics such as Macor™ broke in such experiments. The high strength of the glass-ceramics of the invention is believe attributable to the high crystallinity of interlocking tabular fluormica crystals and the strong bonding present in this fluormica, where a predominance of divalent cations, such as strontium (or strontium combined with barium), predominates in the mica interlayer. This increased interlayer bonding strength is likely also responsible for the increased hardness, while the interlocking tabular crystallinity allows machinability. The machinable glass-ceramics of the invention have a dielectric constant of <8 (typically being in the range of 6-8) at 25° C. and 1 KHz; a loss tangent of <0.002 at 25° C. and 1 MHz; a CTE in the range of 80-120×10$^{-7}$/° C. in the temperature range of 25-300° C.; and a Poisson's ratio of approximately 0.25 and a porosity of 0%.

The machinable glass-ceramics can be formed by methods known in the art, for example, U.S. Pat. No. 3,756,838. In the broadest terms, the present invention consists of melting a batch for a glass consisting essentially of, by weight percent on an oxide basis, 33-55% SiO$_2$, 6-18% Al$_2$O$_3$, 12-27% MgO, 5-25% SrO, 0-20% BaO, 1-7% K2O and 3-12% F. It is critical to the invention to have significant SrO present both as a good glass-enhancing oxide and to allow Sr$^{2+}$ to act as a strongly-bonded interlayer cation. Consequently, all composition in accordance with the invention contain at least 5 wt % SrO. Additionally, at least 1 wt % K$_2$O must be present to prevent undesirable water-swelling effects that are known to occur with pure Sr-mica glass-ceramics. After melting, the resulting glass is cooled below the transformation range, formed into the desired shaped, and subsequently heat treated at a temperature in the range of 800-1200° C., preferably at a temperature in the range of 1000-1150° C., for a time sufficient to secure crystallization in situ. [The transformation temperature is defined as the temperature at which the liquid melt has been formed into an amorphous solid; that temperature commonly considered as lying between the strain point and annealing point of a glass.] Those skilled in the art appreciate that in as much as crystallization in situ is both time and temperature dependent, the higher the temperature the shorter will be the time required for crystallization. When the temperatures are at the upper end of the range the time will be shorter (for example, 1-2 hours or less) and when they are at the lower end of the range they will be longer (for example, 20-40 hours).

Colored machinable glass-ceramics in accordance with the invention can also be made by addition of an appropriate colorant to the glass batch prior to melting and ceramming. Examples, without limitation, of such colorants include Co$_3$O$_4$, CoO (blue-violet); NiO (grey-brown); Cr$_2$O$_3$ (green-brown); CuO (blue-green); FeO, Fe$_2$O$_3$ (green-brown when added at ≦3 wt %); NiS (grey); and CdS (yellow). The colorants are added in an amount in the range of >0 wt % to ≦3 wt %, except that when the desired color is black and the colorant is iron, the iron is present in an amount in the range of >3 wt % to ≦20 wt %. The colorants are added in the form of metal oxides and/or sulfides. At levels of ≦3 wt % the colorants are simply added to the glass batch prior to melting.

Black machinable glass-ceramics can be made by adding FeO+Fe$_2$O$_3$ in an amount in the range of >3-20 wt %, preferably in the range of 7-15 wt %, to the glass batch prior to melting. The iron colorant(s) may simply be added to the batch or can be a replacement for some of the magnesia and/or alumina present in the batch. However, when iron is added to produce a black machinable glass-ceramic, the SrO level must be maintained at least 5 wt % and the K$_2$O level must be at least 1 wt %.

In one embodiment, for colored machinable glass ceramics having a color other than black, a preferred composition consists essentially of 36-55% SiO$_2$, 7-17% Al$_2$O$_3$, 13-27% MgO, 3-12% F, 6-25% SrO, 0-20% BaO, 1-7% K$_2$O and >0 wt % to ≦3 wt % colorant.

In a further embodiment, the invention is directed to a black colored, machinable glass-ceramic consisting essentially of 35-55% SiO$_2$, 7-13% Al$_2$O$_3$, 13-20% MgO, 3-12% F, 6-20% SrO, 0-20% BaO and 1-7% K$_2$O, and 7-20% FeO+Fe$_2$O$_3$.

The machinable glass-ceramics of the invention have greater than 50 Vol. % crystalline phase and less than 50 Vol. % glass (non-crystalline) phase. In one embodiment glass-ceramics have a greater than 60 Vol. % crystalline phase and less than 40 Vol. % glass phase. In a further embodiment the glass-ceramics have a greater than 75 Vol. % crystalline phase and less than 25 Vol. % glass phase. In addition to the predominant crystalline phase the glass-ceramic can contain minor amounts of additional crystalline phases, for example without limitation, a non-alkali phase like cordierite. The predominant crystalline phase is trisilicic where 2.5<T>3.5 and can be written as a formula A$_{0-.5}$R$_{2-3}$T$_{2.5-3.5}$O$_{10}$X$_2$ where A, R, T and X are as described above.

The machinable glass-ceramics of the invention have a dielectric constant of <8 (typically being in the range of 6-8) at 25° C. and 1 KHz; a loss tangent of <0.002 at 25° C. and 1

MHz; a CTE in the range of $80-120 \times 10^{-7}/°C$ in the temperature range of 25-300° C.; a Poisson's ration of approximately 0.25; and a porosity of 0%.

Table 1 compares the broadest composition of the glass-ceramic disclosed herein ("Claimed") and those of two commercially machinable glasses, Macor™ (Corning Incorporated, Corning, N.Y.) and Vitronit™ Vitron Spezialwerkstoffe GmbH, Thuringen, Germany). Machinable glass-ceramics MC-LD and MC-HD (Marketech, Port Townsend, Wash.) are identified as being alkaline or alkaline earth zirconium phosphate $NaZr_2P_3O_{12}$ or $BaZr_4P_6O_{24}$, and do not contain silica, alumina, magnesia, potassium oxide or fluorine as far as can be determined. Other machinable glass-ceramics whose analyzed composition or formula could not be identified are Micaver® (St. Gobain, Nemours Cedex, France) and Photoveel (available from Scientific Instrument Services, Inc, Ringeos, N.Y.).

TABLE 1

| | Composition, wt. % | | | | | | | |
|---|---|---|---|---|---|---|---|---|
| | $SiO_2$ | $Al_2O_3$ | MgO | SrO | BaO | $K_2O$ | F | Other |
| Claimed | 33-55 | 6-18 | 12-27 | 6-25 | 0-20 | 1-7 | 3-12 | — |
| Macor* | 46 | 16 | 17 | — | — | 10 | 4 | B = 7 |
| Vitronit* | 46 | 29 | 12 | — | — | 5 | 4 | Na = 4 |

*= reported composition by manufacturer

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

I claim:

1. A machinable glass-ceramic consisting essentially of, by weight percent on a oxide basis, 35-55% $SiO_2$, 6-18% $Al_2O_3$, 12-27% MgO, 3-12% F, 6-25% SrO, 5-20% BaO and 1-5% $K_2O$, wherein the predominant crystalline phase of said glass-ceramic is a trisilicic mica.

2. The machinable glass-ceramic according to claim 1, wherein the glass-ceramic has a porosity of 0%, a dielectric constant of in the range of 6-8 at 25° C. and 1 KHz; a loss tangent of <0.002 at 25° C. and 1 MHz; a CTE in the range of $80-120 \times 10^{-7}/°C$. in the temperature range of 25-300° C.; and a Poisson's ratio of approximately 0.25.

3. The glass-ceramic according to claim 1, wherein the glass-ceramic has a mechanical strength greater than 150 MPa.

4. The machinable glass-ceramic according to claim 1, wherein said glass-ceramic has greater than 60 Vol. % crystalline phase and less than 40 Vol. % glass phase.

5. The machinable glass-ceramic according to claim 1, wherein said glass-ceramic has greater than 80 Vol. % crystalline phase and less than 20 Vol. % glass phase.

* * * * *